United States Patent

Rinne

[11] Patent Number: 5,979,911
[45] Date of Patent: Nov. 9, 1999

[54] PROCEDURE FOR FASTENING AN OBJECT AND A HYDRAULIC FASTENING APPARATUS

[76] Inventor: Erkki K. Rinne, FIN-02400, Kela Kirkkonummi, Finland

[21] Appl. No.: 09/051,426
[22] PCT Filed: Oct. 9, 1996
[86] PCT No.: PCT/FI96/00533
§ 371 Date: Jun. 9, 1998
§ 102(e) Date: Jun. 9, 1998
[87] PCT Pub. No.: WO97/13604
PCT Pub. Date: Apr. 17, 1997

[30] Foreign Application Priority Data

Oct. 9, 1995 [FI] Finland ................................. 954791

[51] Int. Cl.[6] .................................................. B23B 5/22
[52] U.S. Cl. ........................... 279/4.08; 279/51; 279/58; 408/239 A; 409/232; 409/234
[58] Field of Search ........................ 279/4.08, 4.07, 279/51, 58; 408/239 A, 239 R; 409/232, 234

[56] References Cited

U.S. PATENT DOCUMENTS

| | | |
|---|---|---|
| 1,432,121 | 10/1922 | Prickett . |
| 4,580,796 | 4/1986 | Baur et al. .................................. 279/4 |
| 4,699,388 | 10/1987 | Sproccati et al. .......................... 279/48 |
| 4,902,177 | 2/1990 | Burnett ..................................... 409/234 |
| 5,096,213 | 3/1992 | Terwilliger et al. ....................... 279/51 |
| 5,820,136 | 10/1998 | Han et al. ................................. 279/131 |

FOREIGN PATENT DOCUMENTS

| | | |
|---|---|---|
| 0561395 | 9/1993 | European Pat. Off. . |
| 2019796 | 11/1970 | Germany . |
| 3925641 | 8/1990 | Germany . |
| 3702851C2 | 12/1995 | Germany . |
| 363541 | 9/1962 | Switzerland . |

*Primary Examiner*—Andrea L. Pitts
*Assistant Examiner*—Monica Smith
*Attorney, Agent, or Firm*—Birch, Stewart, Kolasch & Birch, LLP

[57] ABSTRACT

The invention relates to a procedure for the fastening of objects, e.g. working tools and work pieces, and to a holding device. The invention comprises a self-locking holding collet (2, 22) which fastens the object by means of an actuating element (3) which moves the holding collet to fasten and unfasten the object.

12 Claims, 2 Drawing Sheets

PROCEDURE FOR FASTENING AN OBJECT AND A HYDRAULIC FASTENING APPARATUS

This application is the national phase under 35 U.S.C. §371 of prior PCT International Application No., PCT/FI96/00533, which has an International filing date of Oct. 9, 1996, which designated the United States of America, the entire contents of which are hereby incorporated by reference.

BACKGROUND OF INVENTION-Between

1. Field of Invention

The present invention relates to a procedure for fastening an object in a holding device, as defined in the preamble of claim 1, and to a hydraulic holding device as defined in the preamble of claim 4.

2. Description of Related Art

Several types of hydraulic holding devices are used to fasten tools, work pieces and various shafts. However, prior-art solutions have the drawbacks that they require a large space and are structurally unbalanced, preventing the use of high rotational speeds. Previously known are also small-sized holding devices that make use of the thermal expansion of metals. The drawbacks of these devices are a narrow tolerance range, difficult fastening and releasing procedures and a reduced accuracy due to multiple fastening and releasing operations, which always require heating and cooling. Another drawback with many prior-art holding devices is that their holding force is insufficient to hold objects having notches in them. A notch may be e.g. a segment removed from a cylindrical shaft over part of its length. A further drawback with prior-art holding devices is that their restraint moment varies with the temperature.

SUMMARY OF THE INVENTION

The object of the present invention is to eliminate the drawbacks mentioned above and to achieve an improved holding device which is applicable for use for the fastening of objects in varying temperature conditions. The procedure of the invention is characterized by what is presented in the characterization part of claim 1, and the holding device of the invention is characterized by what is presented in the characterization part of claim 4. Other embodiments of the invention are characterized by what is presented in the other claims. The advantages of solution of the invention include a small size and an accurate holding device whose accuracy and holding capacity are preserved regardless of temperature variations. An additional advantage is a high restraint force achieved in a simple manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
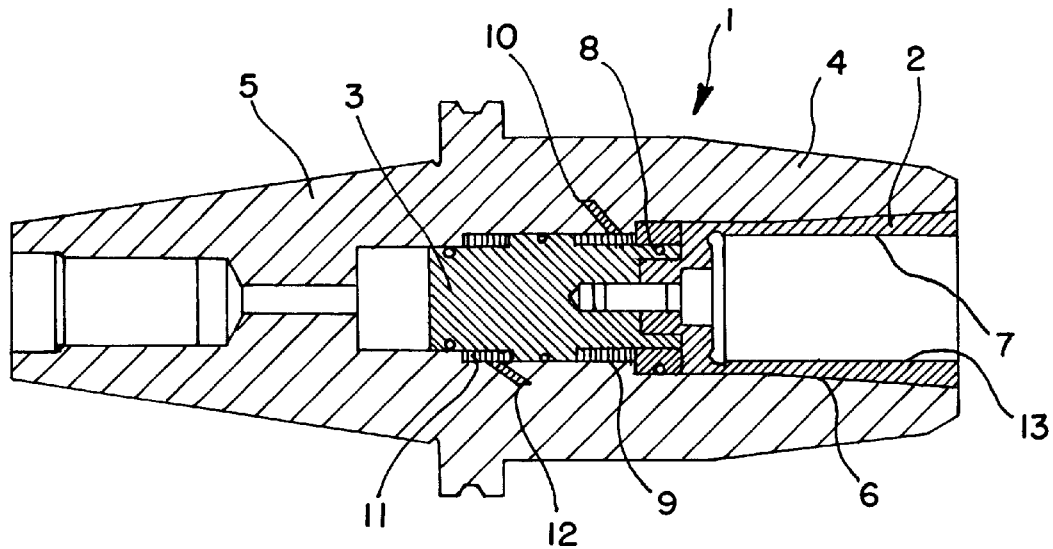
FIG. 1 presents a side view of a fastening arrangement according to the invention.

FIG. 1 shows a holding device 1 comprising a frame which is mounted on a working machine or other substantially fixed body and has a gripping head 4 into which the object to be held by the device is placed. Such an object may be e.g. a drill bit or equivalent placed in a holding collet 2. In addition, the frame comprises a mounting head 5 by which the holding device itself is connected to the substantially fixed body. In the gripping head 4 there is a bore 13 which is coaxial with the centre axis of the entire holding device. The bore 13 is deep enough to accommodate a holding collet 2 suited for the fastening of a tool or the like. The bore has a conical shape tapering in the direction of its depth; The angle of taper is so selected that a holding collet 2 of a conical external shape placed in the bore will be retained in it by itself.

As an extension of the bore, there is a second bore inside the holding device, which second bore is also coaxial with the centre axis of the holding device. This second bore houses a hydraulic nut 3 which forms a piston movable inside the holding device. Provided in that part of the hydraulic nut which lies closer to the holding collet is an annular pressure chamber 9 with a hydraulic duct 12 connected to it. The hydraulic nut is attached to the holding collet via a screw thread 8, so that when the chamber 9 is pressurized, the hydraulic nut will move towards the mounting head 5 of the holding device, thereby drawing the holding collet with a great force into the bore 13.

Figure 2:
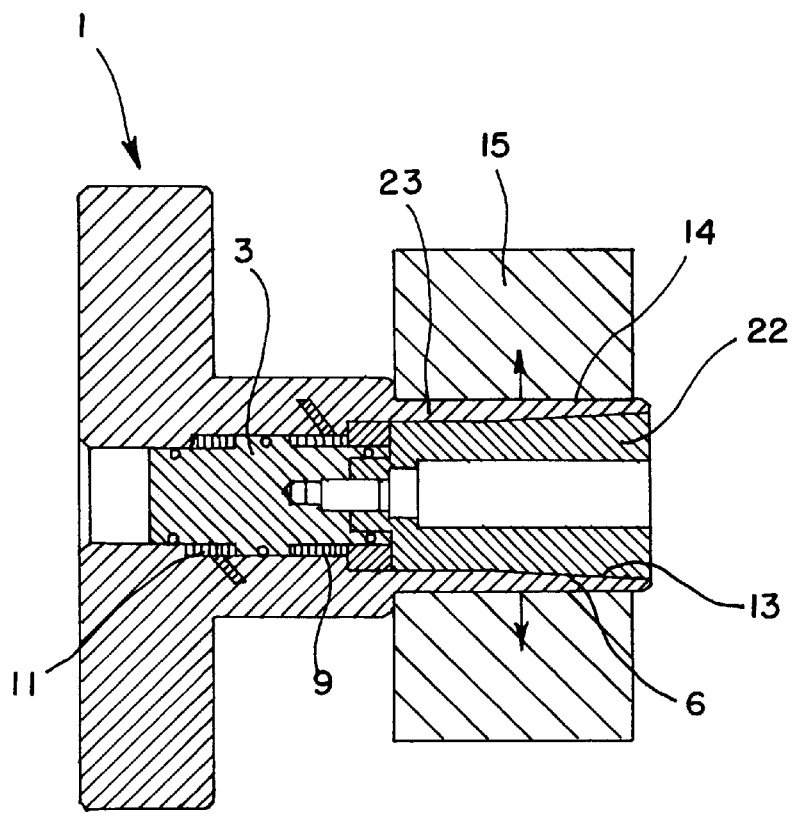
FIG. 2 presents another solution according to the invention, in which the object is fastened in a holding device on an expandable dowel-shaped holding part.

FIG. 2 shows a holding device according to the invention, designed for objects 15 provided with a hole to fasten them on the holding device, such as gear wheels or couplers. This holding device could just as well have a conical mounting head as in the solution illustrated by FIG. 1, but this figure shows a flange-shaped part by which the holding device itself is attached. The gripping head 23 of the device is a hollow dowel whose outer surface 14 is designed to act as a holding surface. The gripping head 23 has a bore 13 corresponding to that in the holding device in FIG. 1. The bore is coaxial with the centre axis of the entire holding device and deep enough to accommodate a conical holding collet 22. The bore has a conical shape tapering in the direction of its depth. The angle of taper is so selected that a holding collet 22 with a conical external surface 6 placed in the bore will be retained in it by itself.

Inside the frame there is a hydraulic nut 3 as in the solution illustrated by FIG. 1, and the holding collet 22 is attached to the hydraulic nut as described above. When an object 15 is to be fastened onto the device, the object 15 is first placed onto the gripping head 23, whereupon the tightening process is activated by pressurizing the pressure chamber 9 lying closer to the gripping head. The hydraulic nut now draws the holding collet 22 tightly into the conical bore 13 and the gripping head 23 expands, thereby tightening the object 15 in position. Correspondingly, when the object 15 is to be removed, the other annular pressure chamber 11 is pressurized, with the result that the hydraulic nut pushes the holding collet 22 outwards from the conical bore 13 and the gripping head 23 contracts.

Figure 3:
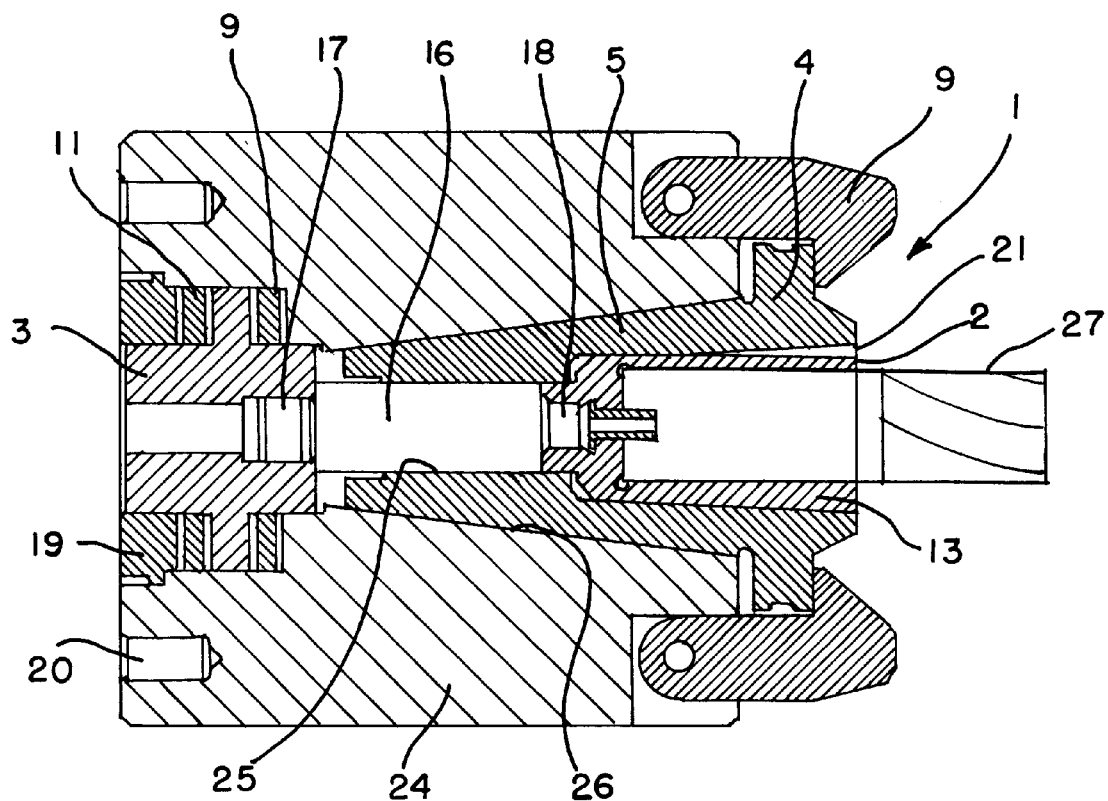
FIG. 3 presents a third solution as provided by the invention.

FIG. 3 shows a solution according to the invention in which the hydraulic nut acting as a tightening element has been removed from inside the holding device and placed in a separate chucking bench 24. This arrangement allows a smaller, lighter and simpler structure of the holding device itself. In addition, a more balanced holding device 1 is achieved. As the tightening element has been removed from the holding device, part of the length of the device has also been eliminated and the conical bore 13 extends partly into the mounting head 5. Therefore, the holding device is as short and simple as possible. The gripping head 4 is very short, consisting of only a short external conical part and a cylindrical part. The mounting head 5 forms an immediate extension of the cylindrical part and has a concentric bore 25 going through it and merging into the self-locking conical bore 13.

The chucking bench comprises a frame with a centric conical bore 26 such that the conical mounting head 5 of the holding device fits into it. The tapering angle has been so selected that the conical bore 26 is not self-locking. As an extension of the conical bore 13 inside the frame there is a second bore which is concentric with the conical bore. Placed in this second bore is a hydraulic nut 3 actuated by fluid pressure and acting as a tightening element, whose structure and operation correspond to those of the hydraulic nut described in connection with the previous figures.

However, there is the difference that the hydraulic nut in this case is not connected directly to the holding collet 2 or 22, but instead this connection is implemented using a connecting pin 16. The first end of the connecting pin is provided with a threaded part 17 attaching the connecting pin to the hydraulic nut 3. Similarly, the second end of the connecting pin has a threaded part 18 for attaching the connecting pin to the holding collet 2 or 22 when an object is to be fastened in the holding device. The hydraulic nut is locked in its housing with a fixing nut 19 and the chucking bench is fixed to its base with screws 20. The hydraulic nut receives its driving power either from a regular power source or in the same way as in the solutions illustrated by FIG. 1 and 2. Moreover, the chucking bench is provided with holding claws 19 to secure the holding device in the chucking bench 24 when the holding collet is being removed. Using suitable adapter cones, different holding devices can be fitted in the conical bore 26.

FIG. 3 additionally shows an empty wedge-shaped area 21 between the holding collet 2 and the conical bore 13. This area is a longitudinal spline in the holding collet. The outer surface of the holding collet may be provided with splines at even distances to allow the compression of the collet to be achieved with a smaller force than would be needed for the compression of a solid-walled collet. Moreover, the grease needed on the surfaces will be squeezed into the splines, ensuring a good self-locking capability of the collet.

The solution of the invention is additionally characterized in that, to make the joint between the holding device 1 and the holding collet 2,22, the parts are ground and assembled in a specific order. First, the conical outer surface 6 of the holding collet 2,22 and the conical surface of the bore 13 in the holding device are ground so that they fit to each other. Next, these parts are so assembled that the holding collet will remain prestressed. In this way, the fastening surfaces between them will be perfectly shaped to fit each other, thus eliminating any grinding inaccuracies from the joint and motion surfaces. It is only after this that the other fastening surfaces, such as the inner surface 7 of the holding collet or the outer surface 14 of the gripping head 23, are ground. The result is a high-precision holding device.

Another essential feature of the invention is a hardness difference between the bore 13 in the gripping head and the outer surface 6 of the holding collet 2,22. This difference is achieved e.g. via black nitration, hard chromium plating or other known hard plating methods. The hardness difference ensures that the holding collet will not seize up in the bore 13.

According to the procedure of the invention, the object is fastened as follows. In the embodiment illustrated by FIG. 1 and 2, the holding collet 2 is placed into the conical bore 13 and the hydraulic nut 3 is connected to the holding collet, whereupon pressure chamber is 9 is activated. The hydraulic nut 3 will now move towards the mounting head 5 of the holding device, thereby drawing the holding collet with a great force into the bore 13.

Correspondingly, when chamber 11 is pressurized, the hydraulic nut will move towards the gripping head 4 of the holding device, thereby pushing the holding collet 2 out of the bore 13. As a result, the grip of the holding collet on the fastened object is loosened. The pressure in the hydraulic nut 3 is achieved by using a hydraulic aggregate or a separate pressurizing apparatus using an RTV-2 silicone derivative as a pressure medium, pressed in with a screw. This accessory can also be easily provided with a pressure gauge to allow the pressurizing process to be monitored. The separate pressurizing apparatus connected directly to a connector on the holding device.

In the case illustrated by FIG. 3, the procedure for fastening the object is as above except for the initial stage, which is different. In this case, the holding device 1 and the holding collet 2 together with the object to be fastened are first placed in a chucking bench 24, whereupon the connecting pin 16 attached to the hydraulic nut 3 is connected to the holding collet 2. After this, the collet is tightened, resulting in the fastening of the object. To remove the object, the holding device is placed in the chucking bench and the holding collet is pushed out of the conical bore 13 by means of the hydraulic nut and the connecting pin 16.

It is obvious to a person skilled in the art that the invention is not limited to the examples described above, but that different embodiments of the invention may vary within the scope of the following claims, Thus, for example, the holding collet 2 can be partially split open and sealed with silicone-treated rubber, in which case it will have a larger adhesion area than a holder with a solid conical collet has. In this case, the holding collet is ground after it has been sealed, and then drawn into the bore 13 to prestress it, whereupon the whole holding device is ground again. In addition to the fastening of working tools and/or work pieces, the arrangement of the invention is also applicable for the fastening of turbine wheels, pumps and other corresponding mechanical parts.

I claim:

1. A holding device comprising:
    a gripping head, the gripping head holding an object;
    a conical bore disposed in said gripping head;
    a mounting head being part of the holding device; and
    a holding collet having an adhesion surface to fasten the object, the holding collet being movable in the conical bore and being tapered to hold the object, the holding collet remaining fastened in the bore due to its self-locking property.

2. The holding device as defined in claim 1, wherein an outer surface of the holding collet is harder than the conical surface of the bore.

3. The holding device as defined in claim 1, wherein said adhesion surface is prestressed.

4. A procedure for fastening an object in a holding device, comprising the steps of:

holding the object with a gripping head, the gripping head having a conical bore;

providing a mounting head as a part of the holding device; and gripping the object by a self-locking holding collet positioned in the gripping head, the holding collet gripping the object as the holding collet is drawn in its axial direction into the conical bore, the holding collet conforming to the conical bore and having an adhesion surface.

5. The procedure as defined in claim 4, wherein to actuate the hydraulic nut, an RTV-2 silicone derivative is used as a pressure medium.

6. The holding device as defined in claim 4, wherein an outer surface of the holding collet is a black-nitrated, self-locking conical surface.

7. The procedure as defined in claim 4, further comprising the steps of:

placing the object in the holding collet in the gripping head prior to the step of gripping;

placing the holding device in a separate chucking bench after the object is placed in the holding collet; and providing a hydraulic nut in the separate chucking bench to draw and taper the holding collet, whereby the object in the holding collet is held in place.

8. The procedure as defined in claim 4, wherein during the step of gripping, a pressure chamber is activated to allow a hydraulic nut to draw the collet into the gripped position.

9. The procedure as defined in claim 8, further comprising the step of moving the hydraulic nut in its axial direction towards the the gripping head, thereby reducing the tapper of the holding collet.

10. The procedure as defined in claim 9, wherein the holding collet grip is released, thereby allowing removal of the object from the holding collet.

11. The procedure as defined in claim 4, wherein said object is a working tool or a work piece and wherein the procedure further comprises the step of placing the working tool or work piece in the self-locking holding collet.

12. The procedure as defined in claim 4, further comprising the step of affixing the mounting head to a separate body.

\* \* \* \* \*